Feb. 3, 1942.   W. L. CARLSON   2,272,056
RADIO COURSE INDICATOR
Filed Sept. 23, 1938
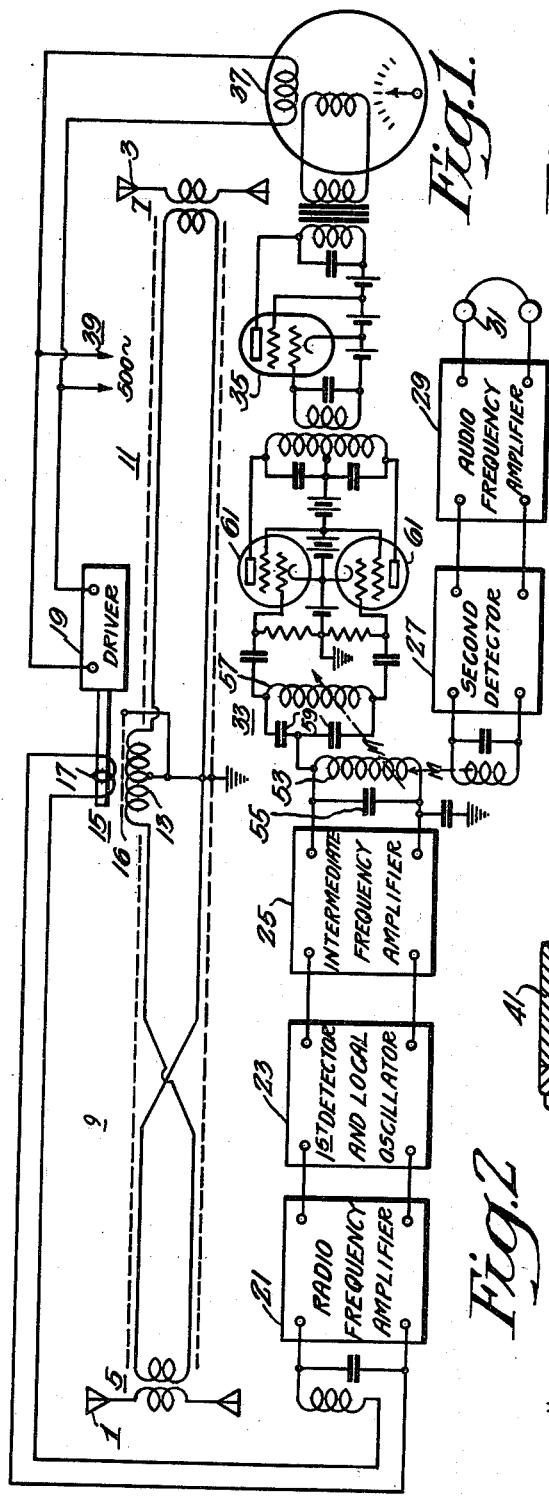
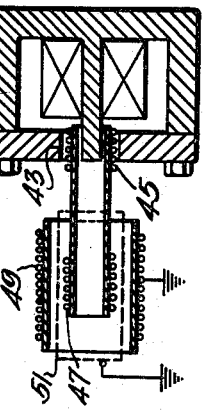
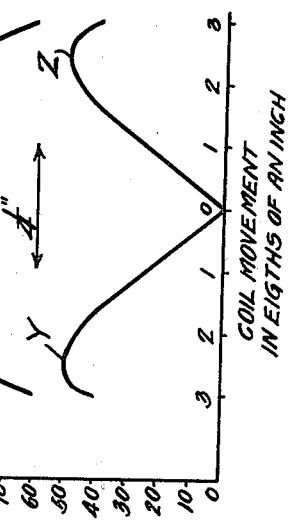
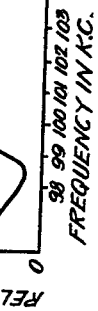
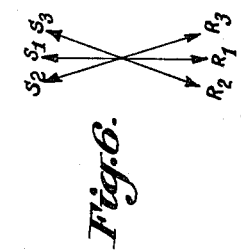
Inventor
Wendell L. Carlson
By
Attorney Patented Feb. 3, 1942

2,272,056

UNITED STATES PATENT OFFICE 2,272,056

RADIO COURSE INDICATOR

Wendell L. Carlson, Haddonfield, N. J., assignor to Radio Corporation of America, a corporation of Delaware Application September 23, 1938, Serial No. 231,300

10 Claims. (Cl. 250—11)

My invention relates to radio course indicators and especially to an indicator which distinguishes departures to the left or right of a course toward a radio transmitter and permits modulated signals to be received without interference with or from the course indicator.

I am aware of the use of radio course indicators in which a reference current is combined in alternate phase with currents from a directive antenna. In these indicators the phase of the reference current is compared with the phase of the currents from the directive source after their modulation by the reference currents and subsequent demodulation. While such devices indicate the "sense" of course departures, they are not especially suitable for the simultaneous reception of voice or other modulated signals. One reason for the difficulty of obtaining both directional and telephonic signals in the prior art devices is the interference of the reference and signal types of modulation.

It is one of the objects of my invention to overcome this difficulty. Another object is to provide means for obtaining simultaneously direction indicating signals and modulation signals. Another object is the provision of means whereby a directional signal is obtained by a frequency modulated signal and an amplitude modulated signal is used for telegraphic or telephonic signals. An additional object is to provide means for receiving a radio frequency carrier and frequency modulating the carrier, whereby the phase of the frequency modulated carrier may be compared to the phase of the currents from the modulator. A further object is to provide means whereby radio course or bearing information may be obtained without sky wave effects. A still further object is to provide means for the operation of a direction and sense indicator at the point of maximum response of the directive array.

The invention will be described by reference to the accompanying drawing in which Figure 1 is a schematic circuit diagram of an embodiment of the invention;

Figure 2 is a sectional view of one form of modulator; and

Figures 3, 4, 5, and 6 are graphs descriptive of the operation of the invention.

Referring to Fig. 1, a pair of vertical rod antennas 1, 3 are coupled, respectively, through radio frequency transformers 5, 7 to shielded transmission lines 9, 11. One of the lines is transposed with respect to the other. The lines are terminated in the respective halves of the primary 13 of a radio frequency transformer-modulator 15. The primary is center-tapped, grounded, and shielded. The shielding is indicated by the reference numeral 16. The secondary 17 is fastened to a driver mechanism 19, hereinafter described. The secondary is connected to the input of a radio frequency amplifier 21, which may be omitted if sufficient gain is obtained in the remainder of the receiver.

The receiver proper is preferably of the superheterodyne type including a first detector and local oscillator 23 and an intermediate frequency amplifier 25. The output of the intermediate frequency amplifier is coupled to two channels: one including a second detector 27, audio amplifier 29 and telephonic receivers 31; the other includes a frequency discriminating circuit 33, a pair of "push pull demodulator" tubes 61, amplifier 35, and indicator 37. If desired, the audio amplifier may be omitted. The driver 19 is connected to a source 39 of alternating current having, for example, a frequency of 500 cycles per second. The A. C. source is also connected to the indicator 37. The function of the transformer-modulator is to frequency modulate, without amplitude modulating, the incoming carrier.

One suitable form of modulator is shown in Fig. 2. An electromagnet 41 is energized by a direct current from a source not shown. The magnet includes an annular gap 43. A movable driver coil 45 is positioned within the gap. The movable coil is mechanically connected to secondary coil 47 of short length. The short length secondary coil corresponds to the secondary 17. The short length coil is centrally located within a primary coil 49 which has a length great in comparison with the length of the secondary coil 47. The two coils are preferably closely coupled and electrostatically shielded. The shield is indicated by the reference numeral 51. The primary coil 49 is grounded at its midpoint and corresponds to the primary 13.

An alternating current, preferably of a frequency of the order of 500 cycles per second, is applied to the driver coil 45 to thereby move the secondary coil 47 back and forth within the primary coil 49. This movement is of the order of ⅛ of an inch on either side of the center position. In this region the flux from the secondary is uniform. Because of the uniformity of the flux and the opposite phasing of the two antenna transmission lines, incoming carrier currents will not be modulated by the secondary coil movements when the carrier currents in the secondary are uniform. This condition will be realized when the antennas, which are preferably spaced several feet to several hundred feet apart, depending inversely on the radio frequency, are equally distant from the source of the radio waves. It should be understood that while it is customary to speak of the antennas being equally distant from the source, one really means that the antennas are at points of the same phase in the same approaching wave front. The characteristic curve for the transformer-modulator is represented by graph X of Fig. 3 for the condition of uniform currents. Coil movements of one eighth of an inch, on either side of center, are in the region of uniform flux as shown by the flat portion of the curve X.

When the antennas are so oriented with respect to the wave front that the induced currents are not in phase (see Fig. 4 curves R and S), currents will flow through the center tap to ground. These currents are represented by the curves Y and Z of Fig. 3. Components of the voltage in the opposite halves of the primary will be reversed from each other at any instant. The effect of such components, together with the motion of the secondary, is to cause currents to be induced in the secondary which frequency modulate the carrier currents at a rate equal to the frequency of the coil movements.

The frequency modulated currents are applied to the radio frequency amplifier, first detector and local oscillator, and intermediate frequency amplifier. The amplified intermediate frequency currents are applied to a frequency discriminating circuit 33. The frequency discriminating circuit includes a primary inductor 53 which is shunted by a capacitor 55, and a secondary inductor 57 which is shunted by a pair of serially connected capacitors 59. The high potential terminal of the primary 53 is connected to the common lead of the serially connected capacitors. The characteristic of the output currents, which are now amplitude modulated, is shown in Fig. 5.

The currents in secondary 57 are impressed on the input of a pair of "push pull demodulator" tubes 61. The output of the "push pull" tubes 61 is an audio current which is applied to the amplifier 35, which produces an amplified audio current of the frequency of the local modulator and a phase which is dependent on the radio carrier. The phase of the demodulated carrier and the local reference phase are compared in the indicator 37. An advance or retardation of phase indicates departures to the left or right of the desired course or bearing. The absence of the derived phase indicates that no frequency modulation has been effected and that the indicator is "on course." It should be understood that the frequency discriminating circuit will not be responsive to amplitude modulation.

If antenna 1 is moved in the direction of arrival of the signal, its induced voltage leads the induced voltage at antenna 3. The voltage induced in the half of coil 13, which is fed by antenna 1, will be represented by the broken line curve R in Fig. 4. The voltage induced in the other half of coil 13, which is fed by antenna 3, will be represented by the solid line curve S. The two voltages impressed on coil 13 may be represented by the vector diagram Fig. 6. When the two antennas are in such position as to have induced in them voltages of identical phase, then the voltages induced in coil 13 are represented by $S_1$ and $R_1$. As antenna 1 moves in the direction of arrival of the signal, the voltage induced in the part of coil 13, which is fed by antenna 1, will lead as represented by $R_2$. Simultaneously antenna 3 retreats which causes a lagging voltage to be induced in the other part of coil 13 as represented by $S_2$. If the antennas are rotated in the opposite direction, then the phases of the voltages induced in coil 13 will be reversed as indicated by $S_3$ and $R_3$.

As the coil 17 moves back and forth under coil 13 the phase of the voltage induced in it shifts, depending on the position of the antennas with respect to the wave front of the signal, as indicated by the vector diagram. This causes the carrier to be phase modulated at the rate of, for example, 500 cycles per second. The magnitude of the modulation is determined by the phase displacement of the signals impressed on the two antennas. This in turn causes a deviation frequency proportional to the phase modulation of the carrier and proportional to the frequency at which the coil 17 is moving. The deviation frequency is eventually impressed on the audio discriminator having a characteristic represented by the curve in Fig. 5. The phase of the output audio cycle from the discriminator reverses as the radio frequency shifts from about 99 to 101 kc. During the audio cycle the deviation frequency swings to a higher radio frequency as the coil 17 moves from that part of coil 13 carrying the lagging current, to that part of the coil carrying the leading current. Therefore the phase of the output audio from tube 35 reverses 180° as the rotating antennas pass through the in-phase position. The magnitude of the audio output is proportional to the difference in phase of the voltages induced in the two antennas.

In some installations, for example in aircraft, it is desirable to have a common receiver not only indicate direction but at the same time respond to signal currents. If amplitude modulation signals are to be received, the second detector and audio frequency amplifier, which are coupled to the intermediate frequency amplifier, will be responsive to such signals. The channel responsive to amplitude modulation will not be affected by the frequency modulation and vice versa.

Thus, the invention has been described as a direction finder in which a local frequency modulation is applied to the carrier, which is thus frequency modulated. The frequency modulated carrier is converted into amplitude modulated currents, which are demodulated. The phase of the demodulated currents is compared to the phase of the local modulation currents. While the frequency of the local modulator is not limited, a high frequency is preferable because it will result in a wide range of frequency modulation and increased efficiency. It is also desirable to use a low intermediate frequency to obtain a sharp discrimination in the intermediate frequency circuits. The ordinary amplitude modulations of the incoming carrier are received in a separate channel, which includes a conventional demodulator.

I claim:

1. In a radio direction finder, a pair of non-directional antennas including connections for deriving series aiding currents from said antennas, local means including a source of reference current for frequency modulating currents induced in said antennas, means for converting said frequency modulated currents into amplitude modulated currents, means for demodulating the last-mentioned currents, and means for comparing the phase of currents derived from the frequency modulated currents with the phase of said reference current.

2. In a radio direction finder, a pair of spaced non-directional antennas including connections for deriving series aiding currents from said antennas, local frequency modulation means including a source of reference current, means coupling said antennas to said local means, whereby incoming signals may be frequency modulated, means for deriving a signal current from said frequency modulated signals, and means for comparing the phase of said derived signal current with the phase of said reference current.

3. In a device of the character of claim 1, a channel connected to the path including said frequency modulated currents and responsive to received amplitude modulated signals.

4. In a device of the character of claim 2, a channel connected to the path including said frequency modulated signals and responsive to amplitude modulated signals impressed on said antennas.

5. The method of indicating the position of a radio wave front with respect to a reference line which includes deriving current non-directively from two points spaced apart at equipotential points in said wave front, frequency modulating said current, converting said frequency modulated current into an amplitude modulated current, demodulating said amplitude modulated current, and indicating the phase of said last-mentioned current by comparison with a reference phase.

6. In a direction indicator, a pair of spaced antennas, a local frequency modulator, said modulator including means for passing in phase currents without modulation and for frequency modulating components of out of phase currents, means coupling said antennas to said modulator, means for demodulating said frequency modulated currents, and means for indicating the phase or presence of said demodulated currents.

7. In a direction indicator, a pair of spaced antennas, a transformer-modulator, including a balanced primary and a movable secondary for frequency modulating currents applied thereto, a source of driving current for moving said secondary, means for moving said secondary with respect to said primary, means coupling said antennas to said balanced primary, means for demodulating frequency modulated currents in said secondary, and means for comparing the phase of said driving current with the phase of said demodulated currents.

8. In a radio direction finder, a pair of spaced non-directional antennas including connections for deriving series aiding currents from the currents induced in said antennas, local means including a source of reference current for frequency modulating currents induced in said antennas, means for converting said frequency modulated currents into amplitude modulated currents, means for demodulating the last-mentioned currents, and means for comparing the phase of the frequency modulated currents with the phase of said reference current.

9. In a radio direction finder, a pair of non-directional antennas including means connecting said antennas in series aiding relation, means including a source of alternating current for frequency modulating currents induced in said antenna, means for demodulating said currents, and means for comparing the phase of the demodulated frequency modulated currents with the phase of currents from said source of alternating current.

10. The method of indicating the position of a radio wave front with respect to a reference line which includes deriving currents non-directionally from equi-potential points spaced along said wave front, frequency modulating said currents, demodulating said frequency modulated currents, and indicating the phase of said last mentioned currents by comparison with a reference phase.

WENDELL L. CARLSON.